June 30, 1931.  F. C. FANTZ  1,812,522
PROCESS OF AND APPARATUS FOR MANUFACTURING METAL PIPE FITTINGS
Filed March 25, 1931  2 Sheets-Sheet 1
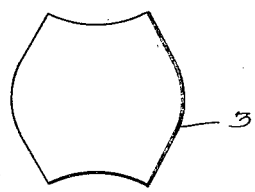
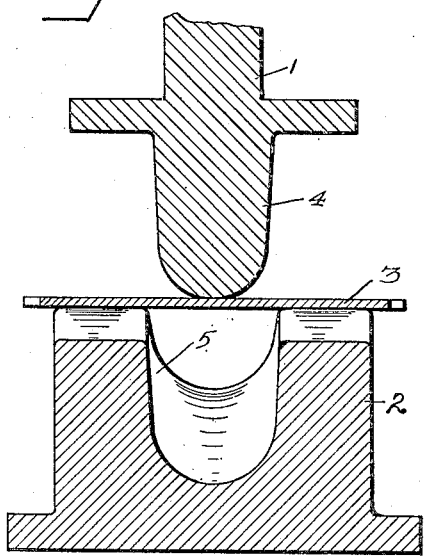
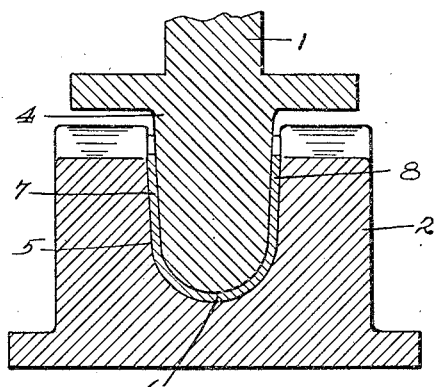
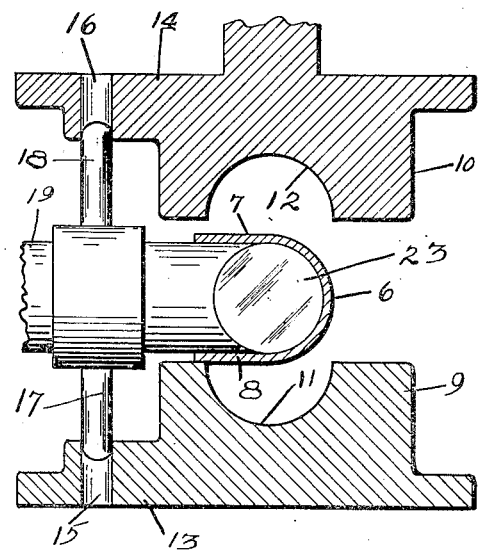
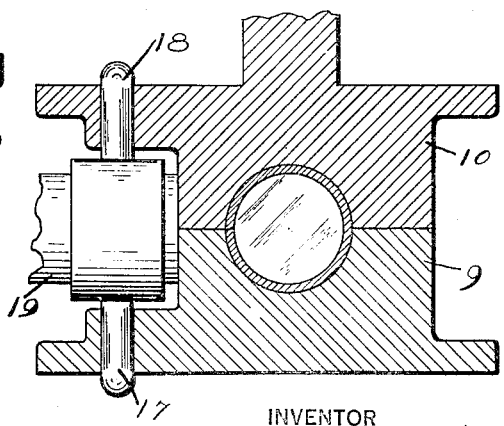
INVENTOR
Fred C. Fantz
BY
Harvey Leal Dodson
ATTORNEY June 30, 1931.  F. C. FANTZ  1,812,522

PROCESS OF AND APPARATUS FOR MANUFACTURING METAL PIPE FITTINGS

Filed March 25, 1931   2 Sheets-Sheet 2

INVENTOR
Fred C. Fantz
BY
Harry Lea Dodson
ATTORNEY

Patented June 30, 1931

1,812,522

UNITED STATES PATENT OFFICE

FRED C. FANTZ, OF WEBSTER GROVES, MISSOURI, ASSIGNOR TO MIDWEST PIPING & SUPPLY CO. INC., OF ST. LOUIS, MISSOURI, A CORPORATION OF MISSOURI

PROCESS OF AND APPARATUS FOR MANUFACTURING METAL PIPE FITTINGS

Application filed March 25, 1931. Serial No. 525,133.

My invention relates to a process of and apparatus for manufacturing metal pipe fittings such as elbows, T's, reducers, etc., where it is desirable to have a free and unobstructed passage for the flow of fluid through the pipe and fitting and where there shall be no inherent weakness in the walls of the fitting due to the thinning of the metal caused during its manufacture.

My invention has for its principal object to provide a process which, if followed, will produce a fitting for work of this character in which there is substantial uniformity of wall thickness throughout its entire area. It is well known that in this work the specification of the A. S. M. E. allows 12½% of the wall thickness for tolerances of fittings of this type. However I have been able to obtain tolerances of approximately one fourth of the standard allowance.

A further object, of my invention, is to provide a process which will produce a fitting in which the metal forming the walls of the fitting is more dense than would be the case with an ordinary stamped or drawn fitting.

A further object of my invention is to provide an improved process whereby the desired final contour of the finished fitting is most effectively attained.

A further object, of my invention, is to provide a process which when followed, will produce pipe fittings with much greater rapidity and less cost than has heretofore been possible.

A further object, of my invention, is to provide a process of making pipe fittings from metal plate whereby the strength of the stock used in the manufacture of the fitting will actually be increased during the operation.

My means of attaining the foregoing objects may be more readily understood by having reference to the accompanying drawings which are more or less diagrammatic in form since it will be obvious to persons skilled in the art that once being placed in possession of the steps of the process invented by me, the apparatus employed can be widely varied.

Fig. 1 is a plan view of a blank for forming a fitting in accordance with my improved process;

Fig. 2 is a transverse sectional elevation of dies used in forming a fitting by my improved process;

Fig. 3 is a similar view showing the dies closed;

Fig. 4 is a transverse sectional elevation of the dies for the next step of the process, the dies being in the open position which they occupy at the beginning of the operation of closing the fitting formed by the dies shown in Figs. 2 and 3;

Fig. 5 is a similar view showing the dies closed;

Similar reference numerals refer to similar parts throughout the entire description.

Figure 6:
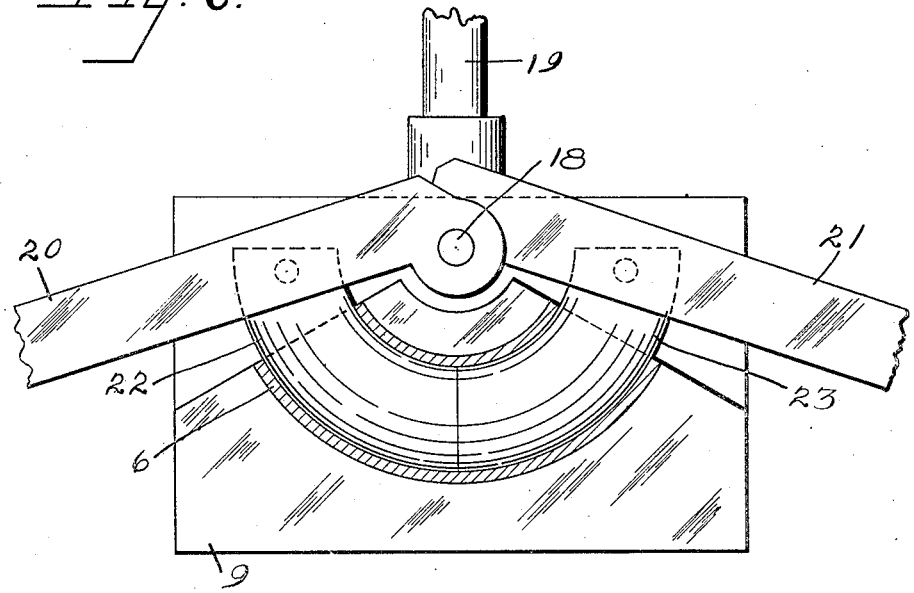
Fig. 6 is a top or plan view of the lower dies showing the form of mandrel used, the fitting being shown in section.
Figure 7:
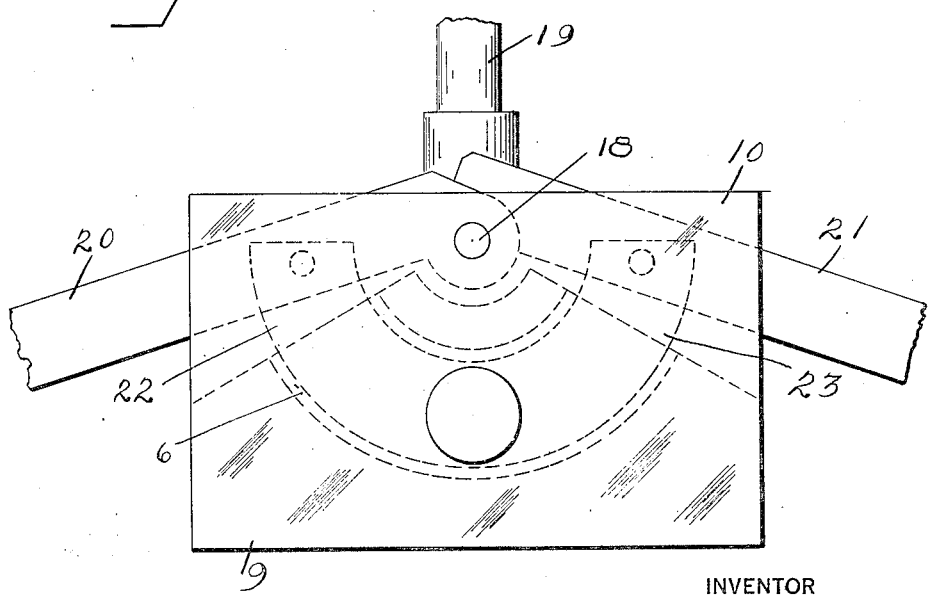
Fig. 7 is a top or plan view of the finishing dies, the fitting and mandrel being shown in dotted lines.

Before entering into a detailed explanation of the process and steps employed therein, it is to be understood that the process is not limited to the details of construction and the arrangement of parts shown in the drawings since the process is capable of being practiced and carried out with various forms of apparatus. Also I desire it to be understood that the phraseology or terminology employed herein is solely for the purpose of description and not limitation and I do not desire to be understood as intending it to limit the invention beyond such limitations as may appear in the hereinafter appended claims.

As shown in the drawings, my process employs a series of dies. As shown in Figs. 2 and 3, these comprise an upper or plunger die 1 and a lower die 2. I first provide a blank 3 formed of metal plate, but where an elbow is to be formed, in the form shown in Fig. 1, the metal preferably having thickness greater than is desired for the final fitting, or it may be the same thickness or of less thickness if it is of sufficient size to provide an excess of metal. It will be understood that both the male portion 4 of the upper or plunger die 1 and the female portion 5 of the lower die 2 is arcuate longitudinally on whatever radius or curvature is desired for the finished fitting. The blank 3 is placed in the position shown in Fig. 2. The dies are brought into the position shown in Fig. 3, forming the blank 3 into a U-shaped member 6, the side walls 7 and 8 of the U-shaped member 6 are considerably upset by the operation of the dies as shown in Figs. 2 and 3.

A mandrel is then inserted in the U-shaped member 6 which is then placed horizontally intermediate a lower die 9 and upper die 10, these dies having concave arcuate portions 11 and 12. The dies are preferably provided with lateral extensions 13 and 14 in which are formed apertures 15 and 16 for the reception of guides 17 and 18. These guides are formed by the ends of a pin 19 which acts as a pivot for the mandrel arms 20 and 21, more clearly seen in Fig. 6. The two dies 9 and 10 are then brought together. This operation serves to form the sides 7 and 8 of the U-shaped piece 6 until their edges meet. This operation has the effect of ironing or smoothing out the upset portion of the side walls 7 and 8. The mandrel as shown in Fig. 6 is split and has two arcuate members 22 and 23 serving to ensure a smooth interior wall for the fitting. As will be seen from Fig. 5, the guides 17 and 18 serve to not only guide the two dies in the operation of forming the sides of the U-shaped member, but also act as a hinge so as to permit the split mandrel to be swung out of the fitting, when the dies have fully closed the sides 7 and 8 of the U-shaped piece.

The fitting is then welded along the face of the two edges where they abut.

The fitting is then heated to a proper temperature and a finishing mandrel may be inserted into the fitting if desired and it is placed in a pair of finishing dies corresponding to the dies shown in Figs. 4 to 6 inclusive except that these dies and the mandrel employed are exact as to the desired or required thickness of wall for the finished fitting. The heated fitting is then compressed, between the dies and the finished mandrel, with the result that I obtain a fitting which will furnish walls the thickness of which will meet or be within the A. S. M. E. specifications for work of this character. At the same time by employing a blank which has an excess of metal greater than that needed for the finished fitting, it follows that the metal must necessarily be compressed in the die and I therefore am able to produce a fitting of greater density and consequently greater strength than could otherwise be obtained.

Another very desirable feature of my process is that after welding I heat the welded fitting to the proper temperature and then compress it in the dies. This has the effect of relieving all strains due to the welding operation and also produces the best physical structure for the metal in the finished fitting.

While the description and drawings show only the application of my process to the manufacture of an elbow it will be obvious that all that would need to be done if fittings of other shapes are desired to change the shape of the dies which, as pointed out, would not in the least change the process.

Having described my invention what I regard as new and desire to secure by Letters Patent of the United States:

1. The process of forming pipe fittings which consists in providing a suitable blank of metal having an excess above that desired for the walls of the finishing fitting, bending the blank into an arcuate form U-shaped in cross section thereby upsetting its sides, fitting a hinged mandrel into said U-shaped piece pressing the sides of said blank towards each other over said mandrel until their edges abut, thereby distributing the metal to the required places, welding said edges, reheating said fitting, compressing same and between dies of the exact size required.

2. The process of forming pipe fittings which consists in providing a suitable blank of metal having an excess above that desired for the walls of the finished fittings, bending the blank into an arcuate form U-shaped in cross section thereby upsetting its sides, fitting a hinged mandrel into said U-shaped piece pressing the sides of said blank towards each other over said mandrel until their edges abut, thereby distributing the metal to the required places, welding said edges.

3. Apparatus for forging pipe fittings comprising, a die formed in two parts having an arcuate recess therein which is circular in cross section said die provided with openings, a two part mandrel adapted to extend into said recess but spaced therefrom, arms to which each half of said mandrel is secured, a guide for said dies which extends into said openings in said dies, said guide constituting a hinge pin for said arms whereby the mandrel may be swung out of the finished fittings.

FRED C. FANTZ.